Nov. 8, 1932.    J. G. SCHOTTHOEFER    1,887,437
MICROMETER
Filed March 3, 1927
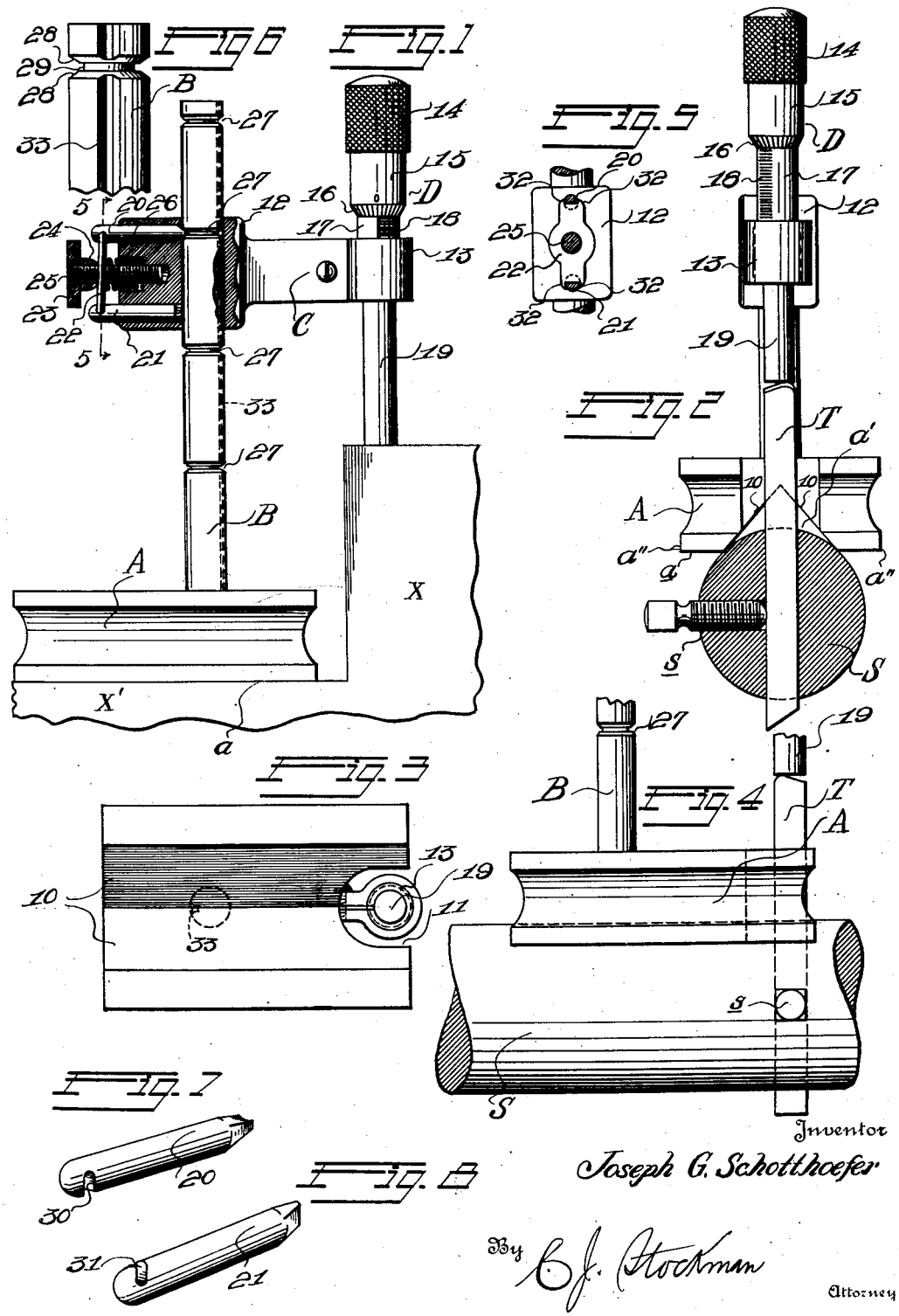
Inventor
Joseph G. Schotthoefer
By C. J. Stockman
Attorney Patented Nov. 8, 1932

1,887,437

UNITED STATES PATENT OFFICE

JOSEPH G. SCHOTTHOEFER, OF PEORIA, ILLINOIS

MICROMETER

Application filed March 3, 1927. Serial No. 172,435.

The measuring device which constitutes this invention comprehends broadly a micrometer head of approved construction, a base suitably formed to engage a surface by which the object to be measured is supported and from which surface the height of said object is to be measured, and appropriate means for supporting the head from the base. In a more restricted sense, the invention comprehends a measuring instrument having the micrometer head and base referred to and in which the means connecting said head and base are of a nature to permit of a quick preliminary setting of the head at various distances relatively to the base, to a position from which the micrometer adjustments may then be made. In another restricted sense, the invention comprehends a base whose surface opposite the head is so formed that it is adapted to rest upon either a plane surface or upon a convex surface, from which the object to be measured projects, and wherein further the connection between the micrometer head and the base is such that the head and base may be relatively turned to occupy one position with relation to each other, as in measuring the height of an object which rests upon or projects from a plane surface and is to be dressed to a specific height, and to occupy another position with relation to each other when the object whose height is to be measured projects from a convex surface. The invention additionally comprehends certain features of detail construction.

A measuring instrument having a base formed to rest upon a surface related to the object of which a micrometer reading is to be made and a micrometer head supported from said base in position to engage the free end of the object to be measured, is new as far as I am aware, and this correlation of base and head is fundamental to the instant invention. It will be noted, however, from the preceding statements with relation to the invention, that the invention additionally includes features of construction of the base and of the connections between the head and base and that these features are designed to extend the utility of the instrument by adapting it for measurements which are generically similar in that they relate to height but which may be different in respect of the character of the object measured and the purpose for which the measurement is made, and in addition, contribute to the facility with which the required measurement may be made without in anywise affecting the accuracy thereof. Measurements of objects of different kinds and with relation to which the measurements are for different purposes may be exemplified, respectively, (1) in relation to an object which rests upon or projects from a plane surface and whose surface opposite the said plane surface is to be dressed to a particular height above said plane surface, and (2) with relation to a fly cutter for example, the extent of whose projection from the boring shaft which carries it may be determined preliminarily to the setting of the fly cutter to a position with relation to the shaft such that a bore of a particular required diameter will be produced.

In respect of the features embodied in the connections between the head and the base, it may be remarked that the drawing which forms a part of this application for patent and which illustrates a preferred embodiment from which all of the several purposes of the invention may be realized, shows connections which include a post or standard which rises from the base, a carrier having a portion sleeved upon the post so as to be adjustable longitudinally and also axially of the latter, the carrier also having a portion which forms a bearing for the micrometer head, and means to secure the carrier releasably in its various adjustments lengthwise of the post or standard and in its different positions axially of said post or standard, and to guide the carrier in its adjustments along the post. Another of the detail features which may be incorporated and which is shown in the accompanying drawing provides, upon the post or standard, means of an indicating nature which in connection with the micrometer reading will give the measurements sought, these means being shown as grooves whose walls form elements co-operating with a locking pin for releasably holding the carrier at corresponding places along the length of the post or standard. While it is preferred that all of these features included in the connections between the head and base be embodied in the device, since the latter will then have an extended range of utility yet, as already suggested, I would have it understood that some and, in fact, all of them may be omitted, but with a corresponding lessening of the benefits obtainable from the construction illustrated without departing from the scope defined by appended claims. In fact, in an application executed by me of even date herewith and designated case B, and which is subsidiary to the instant application, I have illustrated, described and claimed certain simple forms of measuring devices having features which correspond broadly to features herein embodied, one of the said measuring devices being adapted for the measuring of the projection of a fly cutter or the like from a convex surface, another being adapted for the measuring of the height of an object above a plane surface and a third being adapted for the measuring of objects extending from either of such surfaces. In all the forms shown in the said application, case B, the post or standard has at its free end a member immovably attached thereto, instead of the movable carrier herein embodied, for connecting the micrometer head to the post or standard.

In the accompanying drawing illustrating the preferred embodiment of a measuring device having its parts so constructed that it is equally applicable to the measurement of projections extending from a plane surface or from a convex surface, and in which similar letters of reference denote corresponding parts in the several views.

Fig. 1 is a view partly in side elevation and partly in section showing the device applied to the measurement of an object which extends from a plane surface.

Fig. 2 is an end view showing the device applied to the measurement of the distance to which a fly cutter projects from its boring shaft.

Fig. 3 is a bottom plan view of the device with the parts in the position they occupy when measuring the extent of the projection of a fly cutter from its boring shaft.

Fig. 4 is a side elevation of the lower portion of the device applied to the measurement of the extent of the projection of the fly cutter.

Fig. 5 is a detail section on the line 5—5 of Fig. 1.

Fig. 6 is a front view, on a larger scale than the preceding figures, of the upper part of the post or standard particularly intended to show the preferred shape of the groove in which one of the locking pins may project in positively locking the carrier at the corresponding place on the post or standard and to show the groove in which another of the locking pins extends in order to guide the carrier in its movement and adjustments longitudinally of the post or standard.

Fig. 7 and 8 are detail perspective views of the locking pins, respectively.

The base A which I employ in this exemplary embodiment of the invention is oblong in shape. The surface which in its use rests upon a surface from which the measurement is made is marked $a$. To adapt this base to a support having a convex surface, as a boring shaft S, for example, the undersurface of the base is formed with a groove $a'$ appropriate to said support. This groove is preferably of inverted-V shape, as shown, since this form adapts the base to shafts or the like of different diameters. This groove extends longitudinally of the base and its walls, designated 10, 10, converge to a point below the upper surface of the base. In one end of the base and in line with the micrometer head D there is formed a recess 11 which extends entirely through the base, i. e. from top to bottom of the latter. This recess accommodates a fly cutter T, which extends entirely therethrough when the device is applied to a measurement having relation to a fly cutter and, since it is open at the outer surface of the end of the base, it adapts the device to be positioned into and out of operative relation with the fly cutter by moving it endwise along the length of the shaft from which the fly cutter projects. At a suitable distance from the other end of the base and in line with the apex of the groove $a$ in the underside of the base, there is a post or standard B which rises from the upper surface of the base.

The carrier hereinbefore referred to is marked C. This carrier has at one end a member 12 which is fitted to the post B to be slidable thereon and yet to have a definite bearing surface thereagainst. At its opposite end, the carrier C is provided with a member 13 which forms a bearing for the micrometer head D.

This micrometer head may be of the usual construction comprising a knurled handle 14, a thimble 15 having a scale 16, which thimble and its scale have movements rotatively and longitudinally relatively to a barrel sleeve 17 having a stationary scale 18, the micrometer head also including a spindle 19 which is connected to the thimble 14 and head 15 to move therewith and whose free end is arranged to contact with one surface of the object with relation to which the measurement is to be made.

The illustrated means for securing the carrier C in its various positions of adjustment longitudinally of the post or standard B and in its different positions axially with relation to said post or standard comprise two pins marked 20 and 21, respectively, a member 22 whose opposite ends have pivotal connection with the outer ends of said pins, an adjusting nut 23 having a convex surface 24 to bear upon the member 22, a screw 25 whose inner end has threaded engagement with the member 12 of the carrier C and upon whose outer end the nut 23 is threaded, and a spring 26 which is seated in a bore formed in said member 12 and has its outer end engaged with the member 22 and which acts in opposition to the nut 23. The pins 20 and 21 extend through the member 12 of the carrier C with their inner ends in contact with the surface of the post or standard B. It will be noted that when the nut 23 is slackened, the spring 26 will become operative to retract the pins 20 and 21 from their engagement with the post or standard B, whereupon the carrier C and micrometer head C may be adjusted relatively to the post B and base A in the direction of the length of said post and also pivotally, if both adjustments be required. It will be understood that the adjustment of the carrier and micrometer head longitudinally of the post or standard and the base is a preliminary adjustment approximating the height to be measured, the fine adjustment being then made from this place of preliminary adjustment by proper adjustment of the spindle 19 of the micrometer head, in the well known way. The adjustment of the carrier and micrometer head pivotally about the post or standard is to position the micrometer head relatively to the base in accord with the different kinds of measurements hereinbefore referred to, it being noticeable in this connection that when measuring an object from a plane surface and whose surface opposite the plane surface is to be dressed down, the micrometer head is in a vertical plane outside the plane of the end of the base while in measuring for fly cutters, for example, the micrometer head is in a vertical plane which is inside the vertical plane of the end of the base. The offset position of the post B from the longitudinal center of the base contributes to the positioning of the micrometer in either of the two positions suggested with relation to the base. When the required relative adjustments of the carrier and post have been made, they are secured together in their adjusted relation by tightening up upon the nut 23 thereby forcing the inner ends of the pins 20 and 21 into engagement with the post. A frictional engagement of the inner ends of the pins with the surface of the post may be sufficient for all practicable purposes. It is preferred, however, to provide for a more positive locking engagement between the post or standard and the carrier at certain places in the length of the post and particularly at those places which accord with the height of the carrier above the base in many or in most of the required preliminary adjustments. Accordingly, the illustrated embodiment shows the post as formed with a series of grooves 27 which extend circumferentially thereabout and are spaced at equidistances apart, as one inch for example. Any one of these grooves is adapted to receive the inner end of the locking pin 20, and since they extend circumferentially about the post they are engageable by said pins in the different positions of axial adjustment of the carrier C relatively to the post. Their spacing upon the post also is such that they serve as indicators as well as elements of the locking means, since if the user desires to set the carrier C in a position wherein the free end of the spindle 19 of the head D will be three inches above the surface from which the mesurement is to be made, assuming that the spindle is in the position it occupies when the micrometer scales are at zero, he can adjust the carrier C upon the post or standard B to the position in which the pin 20 will be in registration with the particular groove 27 which represents the three inch distance. Each of the grooves 27, as more particularly shown in Fig. 6, has its mouth formed with beveled surfaces 28 which extend inwardly toward each other and inward of said walls there is a recess 29 access to which is afforded through said mouth. Each of these groups, as already stated, is capable of receiving the locking pin 20 whose inner end is beveled in accord with the beveled form of the mouth of the groove. This inner end also projects, or is adapted to project, into the recess 29, the latter being provided particularly to accommodate the inner end of the pin 20 if the latter becomes worn. In this illustrated embodiment, the pivotal connection between the pins 20 and 21 and the member 22 by which said pins are connected with each other is provided for by forming the outer ends of the pins with open ended recesses 30 and 31, respectively, the said recesses being open toward each other. These recesses give the outer end of each pin an approximate hook shape and the ends of the member 22 are formed with correspondingly shaped recesses which provide ears 32 whereby, when the parts are assembled, the outer ends of the pins 20 and 21 will be hooked over the upper and lower edges respectively of the member 22 and will be held against lateral displacement with relation to said member by the engagement of their side surfaces with the ears 32 formed at the ends of the member 22. This member 22 is preferably in the form of a plate having an opening through which the screw 25 extends and also having a widened surface adjacent said screw to contact with the convex member 24 of the nut 23, the engagement of said member 24 and plate being of a nature which permits rocking relative movement of said member and plate. This movement is important since when the locking pin 20 has its inner end seated in a groove 27, the inner end of the other locking pin, 21, may as here shown be in engagement with an ungrooved portion of the post or standard. Moreover, this locking pin 21 is also adapted to traverse a groove 33 which extends longitudinally of the post. It so traverses the groove when the carrier C is being adjusted longitudinally of the post. At this time, the inner end of the locking pin 20 will not, in this exemplified construction, extend into the longitudinal groove, the pivotal connection between the member 22 and the pins and the rocking contact between said member and the convex member 24 of the nut being useful at this time also. In this construction, it will be noted upon reference to Figs. 7 and 8 that the beveled end of the member 20 is of greater width than the width of the groove 33 whereas the beveled end of the locking pin 21 is of greater height than the height of the grooves 27 so that in the longitudinal adjustment the inner end of the pin 20 will traverse the solid portion of the post B and the inner end of the locking pin 21 will traverse the groove 33, whereas in the axial adjustment the inner end of the pin 20 will traverse any one of the grooves 27 while the inner end of the locking pin 21 will be in contact with the post below the groove without entering the latter. It may be here mentioned with relation to the groove 33, in this illustrated embodiment, that its position is such that it serves in conjunction with the locking pin 21 to assure an accurate positioning of the head D in the vertical plane of the apex of the groove formed by the walls 10, 10 in the base A. In other words, the groove 33 and locking pin 21 coact to assure that the spindle 19 of the micrometer head D will be in precise alinement with the fly cutter when the device is being used in relation to the latter, the said fly cutter extending, as shown in Figs. 2 and 3, through the opening 11 formed at one end of said base and being perpendicular to the axis of the boring shaft.

In the use of this instrument in measuring the height of an object extending from a plane surface, the instrument is seated upon said plane surface at a point adjacent the object whose height is to be measured. In the drawing (Fig. 1) the said object is exemplified as one arm or limb X of an L whose other arm or limb is marked X', the latter providing the plane surface upon which the instrument may be seated in a position such that the spindle 19 will contact with the upper surface of the object X'. It will be understood that it is not in anywise essential that the object whose height is to be measured be integral with or otherwise united to the support upon which the instrument base is to rest in making the required measurements. With the instrument in the position shown in Fig. 1, the user finds the height of the object X' and if the dressing has not been done he is able from his micrometer reading to determine precisely the amount to be taken off said object to bring it to the height required. Further measurements and readings as the dressing of the object proceeds may then take place until the object has been brought to the height called for and this will be indicated precisely by the instrument.

In the use of the instrument in the setting of a fly cutter T to produce a bore of a precise required diameter, and assuming that there has been a preliminary cutting of the bore to a diameter somewhat less than that required, the user sets the base upon the boring shaft S in a position in which the spindle 19 will be directly in line with the fly cutter which produced the preliminary bore, or one which has been set to the diameter which would produce such preliminary bore. He then adjusts the micrometer spindle 19 until it contacts with the highest point of the cutting edge of the cutter. He then observes the micrometer reading which, of course, gives him the reading of the preliminary bore. To finish this bore, that is to bring it to the diameter required, the user, noting the difference between the diameter of the preliminary bore and the diameter required, adjusts the spindle 19 to a position which is precisely one-half that difference, and then, having loosened the cutter by slackening the set screw s, he moves the cutter outward until its cutting end is in contact with the free end of the spindle. He then secures the cutter in this position by tightening up the set screw s.

It will be noted that in measuring from a plane surface the micrometer carrier C extends outward from the post or standard B over one end of the base, whereas in setting fly cutters, or in measuring the height of an object projecting from a convex surface, the carrier C extends outward from said post or standard over the opposite edge of the base. The pivotal mounting of the carrier upon the post permits the carrier to be swung from one of its said positions to the other. The opening 11 in one end of the base permits the base to be set close to the cutter since it is in position to accommodate the cutter. The inverted-V shaped groove in the underside of the base adapts the base to be seated upon shafts of different diameters.

In conclusion, mention is made of the fact that while plane and convex surfaces as supports for the base have been mentioned, the instrument is applicable to concave—in short, to curved surfaces of various kinds, as well as to plane surfaces—the edges $a''$ at the opposite sides of the lower surface of the base being adapted to rest upon or engage the wall of a concave surface. Such use is contemplated and is intended to be within the spirit of the invention defined by the claims.

Having thus described the invention, what I believe to be new and desire to secure by Letters Patent, is:—

1. In a micrometer gauge for use in setting fly cutters or the like, a supporting base open from its top to its bottom adjacent one end to accommodate a fly cutter projecting from a boring shaft and also having one of its surfaces formed with a recess to permit the base to rest upon the boring shaft from which said cutter projects, a post or standard which extends from the opposite side of the base, the base and post or standard being wholly upon the same side of the axis of the shaft, and a member to support a micrometer head from said post or standard in position to engage the end of said fly cutter.

2. In a micrometer gauge for use in setting fly cutters or the like projecting from a shaft, a supporting base having a recess in its underside to enable it to rest upon the shaft and also having in one of its ends a recess which extends through the top and bottom surfaces of the base and is adapted to receive the fly cutter by endwise movement of the base upon the shaft, said base also having at its other end a post or standard and a member which projects from the post or standard and supports a micrometer head in position to engage the end of a fly cutter which projects through said recess in the end of the base.

3. In a micrometer gauge for use in setting fly cutters or the like projecting from round shafts and also for measuring the height of objects above a plane surface, a supporting base having one of its ends formed with a recess which extends through the top and bottom surfaces of the base and is to accommodate the cutter, by endwise movement of the base relatively to the cutter, said base also having a recess in its underside to enable it to rest upon the shaft during its said endwise movement and while the measurement is being made, the undersurface of said base also including a plane portion, a post or standard extending from the opposite surface of the base, a member to support a micrometer head in position to engage the end of a fly cutter projecting through said recess in the end of the base, said member being settable to different positions upon the post or standard, and means to secure said member in its different positions upon said post or standard.

4. In a micrometer gauge for use in setting fly cutters or the like projecting from round shafts and also for measuring the height of objects above a plane surface, a supporting base having one of its ends formed with a recess which extends through the top and bottom surface of the base and enables the base to be operatively related to the fly cutter by endwise movement of the base relatively to said cutter, said base also having a recess in its underside to enable it to rest upon the shaft during the said movement and while the measurement is being made, the undersurface of said base also including a plane portion, a post or standard extending from the opposite surface of the base, a member to support a micrometer head in position to engage the end of a fly cutter projecting through said recess in the end of the base, said member being rotatively and longitudinally adjustable upon the post or standard, and means to secure said member in its different positions upon said post or standard.

5. In a micrometer gauge, a supporting base, a post or standard extending therefrom, a supporting member for a micrometer head, having a sleeve through which the post or standard extends, a pair of connected fastening elements carried by the sleeve and adapted respectively to engage the post or standard at different places in the length of the post or standard and means operative to move said fastening elements in substantially parallel planes into or out of fastening relation with said post or standard.

6. In a micrometer gauge, a supporting base, a post or standard extending therefrom, a supporting member for a micrometer head, having a sleeve through which the post or standard extends, a pair of spaced fastening elements carried by the sleeve and positioned respectively to engage the post or standard at different places in the length of the latter, means connecting said elements with each other and means acting upon the connection between said elements and operative to move said elements in substantially parallel planes into or out of fastening relation with the post or standard.

7. In a micrometer gauge, a supporting base, a post or standard extending therefrom, a supporting member for a micrometer head, having a sleeve through which the post or standard extends, a pair of spaced elongated fastening elements carried by the sleeve and whose inner ends are positioned to engage the post or standard respectively at different places in the length of the latter, means connecting the outer ends of said elements with each other, a tensioning means operatively related to said connecting means and tending to force the fastening elements in one direction, and a means operative in opposition to the tensioning means to move the fastening elements in the other direction.

8. In a micrometer gauge, a supporting base, a post or standard extending therefrom, and a supporting member for a micrometer head, having a sleeve through which the post or standard extends, said post or standard having a circumferential groove and a longitudinal groove and elements respectively projectible from said sleeve into said grooves and cooperating therewith to releasably fasten the supporting member to the post or standard and to permit relative movement of said supporting member and post or standard in a defined path longitudinal of the latter, means connecting said elements with each other and an adjusting means common to said elements and engaging said connection.

9. In a micrometer gauge, a supporting base, a post or standard extending therefrom, and a supporting member for a micrometer head, having a sleeve through which the post or standard extends, said post or standard having a circumferential groove and a longitudinal groove and said sleeve having elongated means cooperating with said grooves to releasably fasten said supporting member to the post or standard and to permit relative movement of the supporting member and post or standard in a defined path longitudinal of the latter; said means including elements whose inner ends are respectively projectible into said grooves, a connecting element having pivotal connection with the outer ends of said projectible elements, a tensioning means operatively related to the connecting element, and an operating element acting in opposition to the tensioning means and having rocking contact with the connecting element.

10. In a micrometer gauge, a supporting base, a post or standard, and a supporting member for a micrometer head movably mounted on the post or standard, said supporting member having means including a plurality of fastening elements projectible into engagement with the post or standard, a connecting element for said projectible elements, pivotally connected therewith, a tensioning means operatively related to the connecting element and an operating element having rocking contact with the connecting element and operating thereon in opposition to the tensioning means.

11. In a micrometer gauge for use in setting fly cutters or the like, a supporting base having in one of its surfaces a groove of substantially inverted-V shape to provide a bearing by which the gauge may be supported from a convex surface from which a fly cutter or the like projects, with the apex of the groove in a plane substantially bisecting the cutter or the like longitudinally, the base also having one of its ends formed with a recess which extends through the top and bottom surfaces of the base and enables the base to be operatively related to the fly cutter by endwise movement of the base on said convex surface, a post or standard extending from the opposite end of the base and arranged in a line bisecting the apex of said groove, and a member projecting from said post or standard and adapted to support a micrometer head in line with said cutter or the like.

In testimony whereof I affix my signature.

JOSEPH G. SCHOTTHOEFER.